United States Patent [19]

Takanashi et al.

[11] Patent Number: 5,231,527
[45] Date of Patent: Jul. 27, 1993

[54] LIQUID CRYSTAL DISPLAY WITH SPACER HAVING ELASTIC MODULUS IN COMPRESSION OF 370–550 KG/MM² AT 10% DISPLACEMENT OF DIAMETER

[75] Inventors: Hiroshi Takanashi, Kyoto; Tadashi Nishimori, Wakayama; Katsuhiko Rindo, Wakayama; Akira Yoshimatsu, Wakayama, all of Japan

[73] Assignees: Sharp Kabushiki Kaisha, Osaka; Kao Corporation, Tokyo, both of Japan

[21] Appl. No.: 826,528

[22] Filed: Jan. 27, 1992

[30] Foreign Application Priority Data

Feb. 1, 1991 [JP] Japan .................. 3-11988

[51] Int. Cl.⁵ .................................. G02F 1/1339
[52] U.S. Cl. .................................. 359/81
[58] Field of Search .................................. 359/81

[56] References Cited

U.S. PATENT DOCUMENTS

| | | | |
|---|---|---|---|
| 3,952,092 | 12/1974 | Patterson et al. | 359/81 |
| 4,804,254 | 2/1989 | Doll et al. | 359/81 |
| 4,924,243 | 5/1990 | Sato et al. | 359/81 |
| 4,983,023 | 1/1991 | Nakagawa et al. | 359/81 |
| 5,044,733 | 9/1991 | Kamoi et al. | 359/81 |
| 5,087,114 | 2/1992 | Fukui et al. | 359/81 |
| 5,142,395 | 8/1992 | Yamazaki et al. | 359/100 |

FOREIGN PATENT DOCUMENTS

| | | |
|---|---|---|
| 0311441 | 4/1989 | European Pat. Off. |
| 3510661 | 10/1985 | Fed. Rep. of Germany |
| 3716856 | 12/1988 | Fed. Rep. of Germany |
| 57-211121 | 12/1982 | Japan |

*Primary Examiner*—William L. Sikes
*Assistant Examiner*—Anita Pellman Gross

[57] ABSTRACT

A liquid crystal display having a structure such that two sheets of substrates each provided with a transparent electrode and an orientation film are disposed opposite to each other through a spacer particle, which has an elastic modulus in compression of 370 to 550 kg/mm² at the 10% displacement of the particle diameter, and a liquid crystal layer is also provided. As a result of this structure for the liquid crystal display, a uniform display quality can be realized through a reduction in the cell gap deviation caused when use is made of a thin sheet substrate.

7 Claims, 2 Drawing Sheets

LIQUID CRYSTAL DISPLAY WITH SPACER HAVING ELASTIC MODULUS IN COMPRESSION OF 370–550 KG/MM² AT 10% DISPLACEMENT OF DIAMETER

FIELD OF THE INVENTION

The present invention relates to a spacer particle for a liquid crystal display and, particularly to a spacer particle for a liquid crystal display spacer so that a liquid crystal display is capable of realizing a uniform display quality by reducing cell gap deviation (the variation in the thickness of a liquid crystal layer from place to place) caused particularly when use is made of a thin-sheet substrate having a thickness of 1.0 mm or less.

The liquid crystal display of the present invention can be used mainly as a display for OA equipment such as personal computers and word processors.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE RELATED ART

Figure 1:
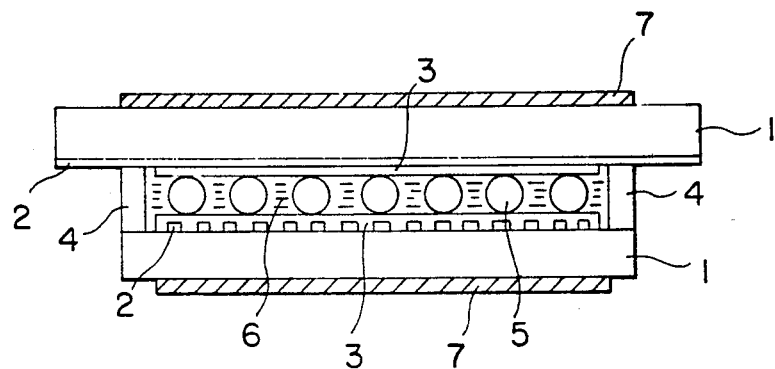
FIG. 1 is a cross-sectional view of an embodiment of the liquid crystal display according to the present invention.

As shown in FIG. 1, a liquid crystal display has a structure such that two sheets of substrates 1 each provided with a transparent electrode 2 and an orientation film 3 are disposed opposite to each other through a spacer particle 5 and a liquid crystal layer 6. Conventionally, the spacer particle 5 used in the display has been mainly a plastic bead polymerized from mainly divinylbenzene and the like and generally having properties such that the elastic modulus in compression at the 10% displacement of the particle diameter is 300 to 350 kg/mm², the mean particle diameter is 3 to 10 μm and the standard deviation of the particle diameter is 10% or less of the mean particle diameter.

In the present specification, the elastic modulus in compression at the 10% displacement of the particle diameter (elastic modulus in 10% compression) is a value measured by the following method.

Method of Measuring Elastic Modulus in 10% Compression

One sample particle was put on a sample mount and a load was applied toward the center of the particle through the use of a Micro Compression Testing Machine (PCT-200 manufactured by Shimadzu Corporation) to determine the relationship between the load and the compression displacement, and thus determining the load at 10% displacement. This load value was substituted in the following equation to calculate the elastic modulus in 10% compression. This procedure was conducted on three sample particles, and the average value was taken as the elastic modulus in 10% compression of the particle. The measurement was conducted at room temperature.

$$E = \frac{3 \times F \times (1 - K^2)}{\sqrt{2} \times S^{1.5} \times \sqrt{R}}$$

wherein E represents a elastic modulus in compression (kg/mm²),
F represents a compressive load (kg),
K represents a Poisson's ratio of the particle (constant, 0.38),
S represents a compression displacement (mm), and
R represents a particle radius (mm).

In the above-described conventional art, no problem occurred when use was made of a glass substrate having a thickness of 1.1 mm or more. However, it has been found that when use is made of a thin substrate (particularly one having a thickness of 1.0 mm or less, for example, a glass substrate having a thickness of 0.3 to 0.7 mm and a plastic substrate having a thickness of 0.1 to 0.7 mm), the difference in the number of spacer particles present among various places is liable to cause the cell gap deviation. Specifically, the cell gap deviation seems to occur through the following mechanism. Because the substrate is liable to bend, the deviation in the number of spacer particles present among various places (for example, 100±30 spacer particles/mmφ) in the step of injecting a liquid crystal under a reduced pressure results in a small deformation in a portion where the number of the spacer particles is large (for example, 130 spacer particles/mmφ) and a large deformation in a portion where the number of the spacer particles is small (for example, 70 spacer particles/mmφ). Thus, the cell gap deviation seems to occur due to the variation in the deformation of the spacer particles from place to place.

SUMMARY OF THE INVENTION

The present inventors have found that the use of a hardly deformable spacer is effective in solving the problem of the cell gap deviation particularly in the case of a thin substrate, which has led to the completion of the present invention.

Thus, the present invention provides a spacer particle for a liquid crystal display having an elastic modulus in compression of 370 to 550 kg/mm² at the 10% displacement of the particle diameter.

It is preferable that the particle has a mean particle diameter of 3 to 10 μm and/or a standard deviation of the particle diameter of 10% or less of the mean particle diameter.

The spacer particle is preferably made of a crosslinked (co)polymer, and is more preferably made of a vinyl copolymer.

Furthermore, the present invention provides a liquid crystal display having a structure such that two sheets of substrates each provided with a transparent electrode and an orientation film are disposed opposite to each other through a spacer particle and a liquid crystal layer, where the spacer particle is the above-described spacer particle of the present invention.

At least one of the two sheets of substrates is a plastic substrate, preferably.

DETAILED DESCRIPTION OF THE INVENTION

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Because the spacer particle of the present invention has an elastic modulus in compression higher than that of the conventional spacer particle, it is less susceptible to deformation when pressed, so that the cell gap deviation can be reduced even when the number of the spacer particles somewhat varies from place to place. However, because the spacer particle is less liable to deformation, there is a tendency that the variation in the particle diameter of the spacer particle brings about the cell gap deviation. For this reason, it is preferred that the standard deviation of the particle diameter be small. For example, when use is made of a thin sheet substrate (for example, a glass substrate having a thickness of 0.3 to 0.7 mm and a plastic substrate having a thickness of 0.1 to 0.7 mm), it is useful to regulate the standard deviation of the particle diameter, $\sigma$, to 10% or less of the mean particle diameter for the purpose of realizing a uniform cell gap.

Polyether sulfone (PES), polyethylene terephthalate (PET), polycarbonate, polyarylate, acrylic resin, etc., are suitable as the material for the above-described plastic substrate.

When use is made of a spacer particle having an elastic modulus in 10% compression exceeding 550 kg/mm$^2$ (for example, a benzoguanamine-based hard plastic bead), because the spacer particle is hardly deformable, it is necessary to regulate the standard deviation of the particle diameter, $\sigma$, to substantially zero, which renders such a spacer particle unsuitable for use in the case of a thin substrate. On the other hand, when use is made of a spacer particle having an elastic modulus in 10% compression less than 370 kg/mm$^2$, the same conditions apply as in the case that the conventional spacer particle is used.

As described above, the spacer particle of the present embodiment has a specified elastic modulus in 10% compression and there is no particular limitation on the process for the preparation, composition, etc. For example, as a spacer particle, a vinyl plastic bead, particularly a vinyl plastic bead having a high crosslinking density may be used. The vinyl plastic bead having a high crosslinking density may be produced by suspension polymerization in the presence of a large amount of a crosslinkable monomer or a large amount of a polymerization initiator.

There is no particular limitation on the above-described crosslinkable monomer as far as it has two or more radical-polymerizable unsaturated double bonds. Examples thereof include vinyl compounds such as divinylbenzene, 1,4-divinyloxybutane and divinyl sulfone; allyl compounds such as diallyl phthalate, diallylacrylamide, triallyl (iso)cyanurate and triallyl trimellitate; (poly)oxyalkylene glycol di(meth)acrylates such as (poly)ethylene glycol di(meth)acrylate and (poly)propylene glycol di(meth)acrylate; and pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, glycerol tri(meth)acrylate and glycerol di(meth)acrylate. These crosslinkable monomers may be used alone or in the form of a mixture of two or more of them. Divinylbenzene is particularly preferred.

All the radical polymerizable monomers other than the crosslinkable monomer may be used as the noncrosslinkable monomer in the production of the above-described vinyl plastic bead. Examples thereof include styrene monomers such as styrene, p-(or m-) methylstyrene, p-(or m-)ethylstyrene, p-(or m-) chlorostyrene, p-(or m-)chloromethylstyrene, styrenesulfonic acid, p-(or m-)tert-butoxystyrene, $\alpha$-methyl-p-tert-amyloxystyrene and p-tert-amyloxystyrene; (meth)acrylic ester monomers such as ethyl (meth)acrylate, 2-ethylhexyl (meth)acrylate, lauryl (meth)acrylate, dimethylaminoethyl (meth)acrylate, diethylaminoethyl (meth)acrylate, hydroxyethyl (meth)acrylate, diethylene glycol mono(meth)acrylate, glycerol mono(meth)acrylate, polyethylene glycol mono(meth)acrylate and butanediol mono(meth)acrylate; unsaturated carboxylic acid monomers such as (meth)acrylic acid and maleic acid; alkyl vinyl ethers such as methyl vinyl ether and ethyl vinyl ether; vinyl ester monomers such as vinyl acetate and vinyl butyrate; N-alkyl-substituted (meth)acrylamides such as N-methyl(meth)acrylamide and N-ethyl(meth)acrylamide; and nitrile monomers such as (meth)acrylonitrile. These noncrosslinkable monomers may be used alone or in the form of a mixture of two or more of them.

Regarding the mixing proportion of the crosslinkable monomer to the noncrosslinkable monomer in the production of the above-described vinyl plastic bead, the proportion of the crosslinkable monomer is preferably 50% by weight or more, and in particular is preferably 70% by weight or more. When the proportion of the crosslinkable monomer is below this range, the resulting vinyl plastic bead may exhibit no sufficient elastic modulus in compression.

Examples of the polymerization initiator include free radical generators such as azo compounds and peroxides. For example, peroxide radical initiators such as benzoyl peroxide and lauroyl peroxide are preferred form the viewpoint of the purpose of the present invention. The amount of use of the radical polymerization initiator is 3 to 10% by weight, and preferably 4 to 7% by weight based on the polymerizable monomer. No plastic bead having a suitable elastic modulus in compression can be prepared in both the cases where the amount of use of the polymerization initiator is excessively small and excessively large.

The aqueous polymerization or the suspension polymerization wherein use is made of the above-described material is conducted according to the conventional procedure at a temperature in the range of 25° to 100° C., and preferably in the range of from 50° to 90° C. in the presence of a dispersion stabilizer while stirring the reaction system. Examples of the dispersion stabilizer include surfactants such as sodium lauryl sulfate, sodium laurylbenzenesulfonate and sodium polyoxyethylene lauryl ether sulfate; water-soluble polymers such as gelatin, starch, hydroxyethylcellulose, carboxymethylcellulose, polyvinylpyrrolidone, polyvinyl alkyl ether and polyvinyl alcohol; and sparingly water-soluble inorganic salts such as barium sulfate, calcium sulfate, barium carbonate, calcium carbonate, magnesium carbonate and calcium phosphate.

The plastic bead used as the spacer particle according to the present invention can also be prepared by methods commonly used in the production of a fine particle of a polymer, such as seed polymerization.

Although the mean particle diameter of the plastic bead used as the spacer particle according to the present embodiment may be arbitrarily designed according to the purpose, the mean particle diameter of the plastic bead is preferably about 1 to 20 μm, and more preferably about 1 to 10 μm.

In the liquid crystal display of the present embodiment as shown in FIG. 1, the upper and lower light-transmitting substrates 1, each provided with a transparent electrode 2 having a predetermined electrode pattern on its surface and an orientation film 3 covering the transparent electrode 2, are disposed so as to face to each other through a spacer particle 5, which has an elastic modulus in compression of 370 to 550 kg/mm² at the 10% displacement of the particle diameter, and a liquid crystal layer 6. As shown in FIG. 1, a liquid crystal layer 6 is held by a sealing material 4 such as an epoxy resin. Numeral 7 designates a pair of polarizing films respectively provided on the top and bottom of the device.

In the liquid crystal display of the present embodiment, there is no particular limitation on the above-described light-transmitting substrates 1 as far as they are light-transmittable, and at least one of the above-described light-transmitting substrates 1 is preferably a plastic substrate. Examples thereof include polyether sulfone (PES), polyethylene terephthalate (PET), polycarbonate, polyarylate and acrylic resin.

In recent years, there is an ever-increasing demand for a liquid crystal display having a reduced thickness and a reduced weight. Conventionally, the cell gap deviation is liable to occur when use is made of a thin sheet substrate, which brings about a problem that the uniformity of the display quality is low. By contrast, the present embodiment has the effect of realizing a thin liquid crystal display having a uniform display quality.

EXAMPLES

The present invention will now be described in more detail with reference to the following Examples, even though the present invention is not limited to these Examples only. In the Examples, the "part(s)" is part(s) by weight.

SYNTHESIS EXAMPLE 1

A liquid mixture comprising 80 parts of divinylbenzene (DVB-810 having a purity of 81% manufactured by Nippon Steel Chemical Co., Ltd.), 20 parts of ethylene glycol dimethacrylate (NK-ester 1G manufactured by Shin-Nakamura Kagaku Kogyo K.K.) and 5 parts of benzoyl peroxide was finely dispersed in 800 parts of a 3 wt. % aqueous solution of polyvinyl alcohol (GH-17 having a saponification value of 86.5 to 89% by mole manufactured by The Nippon Synthetic Chemical Industry Co., Ltd.) to conduct polymerization in a nitrogen gas stream at 80° C. for 15 hr while stirring. The resultant fine particles were washed with deionized water and a solvent, classified, isolated and dried to give fine particles of a crosslinked polymer having a mean particle diameter of 6.0 μm and a standard deviation of a particle diameter of 0.4 μm.

The elastic modulus in 10% compression (mean value) of the fine particle of the crosslinked polymer thus prepared was 380 kg/mm².

SYNTHESIS EXAMPLE 2

A fine particle of a crosslinked polymer having a mean particle diameter of 7.5 μm and a standard deviation of a particle diameter of 0.5 μm was prepared in the same manner as that of the Synthesis Example 1, except that the benzoyl peroxide was used in an amount of 7 parts.

The elastic modulus in 10% compression (mean value) of the fine particle of the crosslinked polymer thus prepared was found to be 420 kg/mm².

EXAMPLE 1

Figure 2:
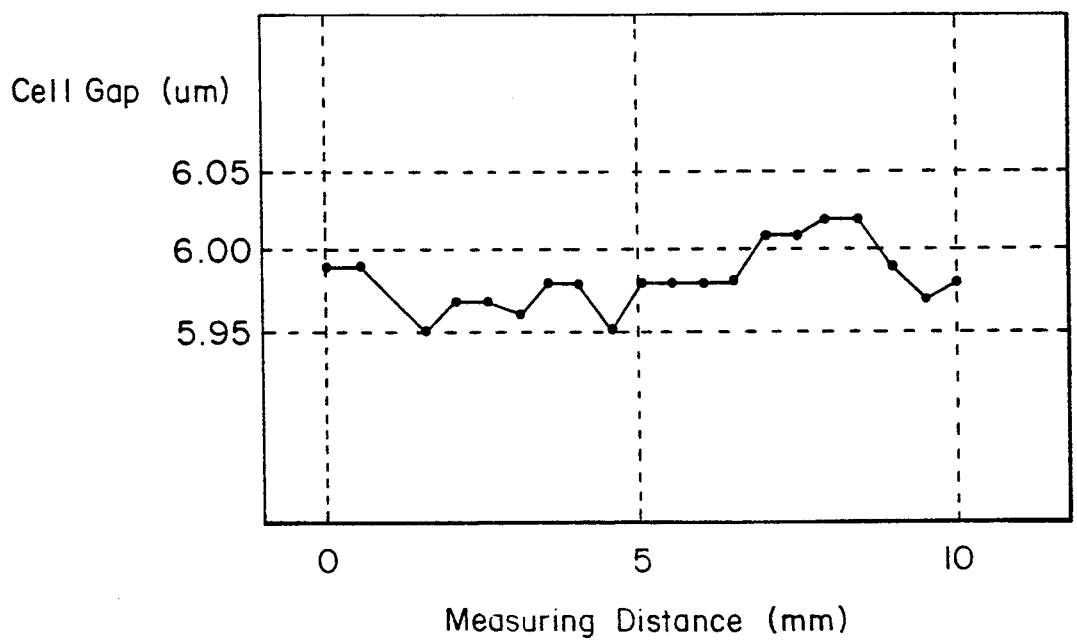
FIG. 2 is a diagram showing a cell gap distribution of the liquid crystal display according to the present invention.
Figure 3:
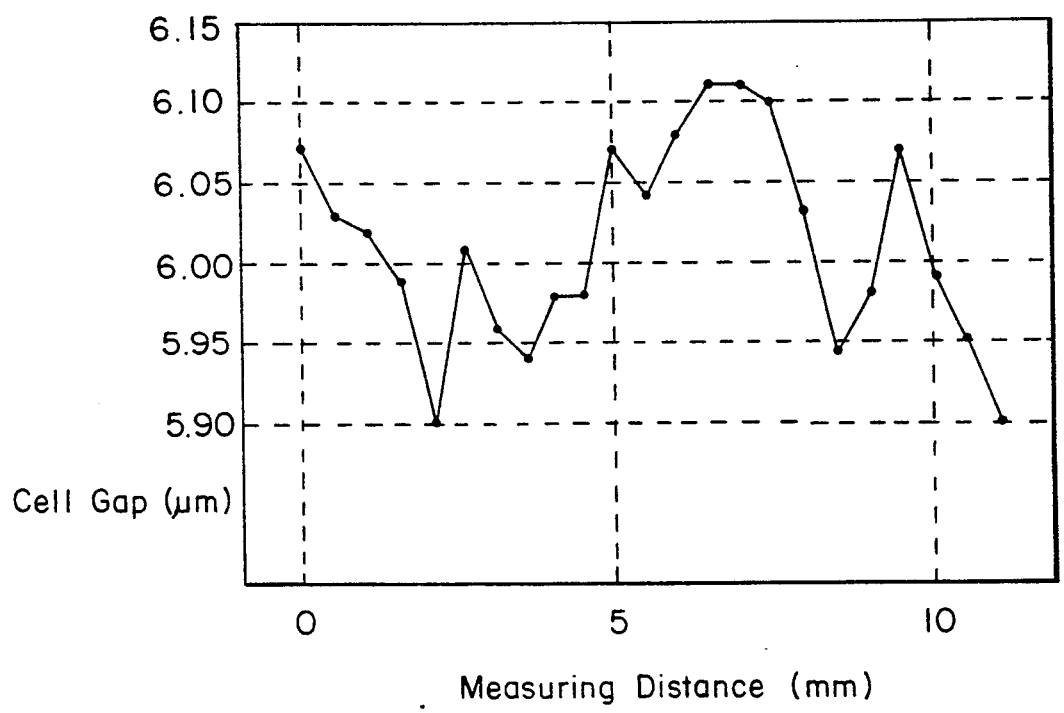
FIG. 3 is a diagram showing a cell gap distribution of the conventional liquid crystal display.
Figure 4:
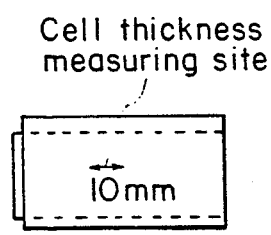
FIG. 4 is a schematic illustration for explaining portions of a cell gap measurement.

A description will now be made on a plastic liquid crystal display wherein the fine particle of the crosslinked polymer prepared in the Synthesis Example 1 or a conventional plastic bead was used as a spacer particle. FIGS. 2 and 3 show the results of a measurement of a cell gap wherein a PES substrate and a PET substrate each subjected to hard coating treatment and having a cell size of about 6 inches and a thickness of 0.4 mm with the cell gap being set at 6.0 μm were used as the light-transmitting substrate 1 shown in the FIG. 1. In FIG. 3, the conventional plastic bead (Micropearl SP manufactured by Sekisui Fine Chemical K.K. having an elastic modulus in 10% compression of 320 kg/mm², a mean particle diameter of 6.0 μm and a standard deviation of particle diameter, σ, of 0.4 μm) was used as the spacer particle, and cell gaps of the liquid crystal display were measured at positions sufficiently distant from the sealed part (See FIG. 4). In FIG. 3, the cell gap (μm) is plotted as the ordinate against the measuring distance (0–10 mm) as the abscissa. In the data, the cell gap varies to a great extent in the range of from 5.90 to 6.11 μm around 6.00 μm. On the other hand, FIG. 2 shows the results of a measurement in the case where use was made of a plastic bead having a high elastic modulus in compression, as a spacer particle, as prepared in the Synthesis Example 1 according to the present embodiment. In this case, the cell gap varies only to a small extent in the range of 5.95 to 6.03 μm around 6.00 μm. This demonstrates the effect attained in the case where use is made of the plastic bead having a high elastic modulus in compression according to the present embodiment as a spacer particle.

Similar measurements were conducted on embodiments wherein a glass substrate having a thickness of 0.7 mm and a plastic substrate having a thickness of 0.4 mm were used respectively as the upper and lower light-transmitting substrates. As a result, good results of substantially the same level as that described above could be obtained.

EXAMPLE 2

The fine particle of the crosslinked polymer prepared in the Synthesis Example 1 was used as a spacer particle, and a glass sheet having a thickness of 0.7 mm was used as a substrate to prepare a super-twisted nematic liquid crystal display having a cell size of 10 inches in terms of the diagonal size, the number of dots of 640×480 and a cell gap of 6.0 μm. The obtained display exhibited a uniform display quality free from the cell gap deviation.

EXAMPLE 3

The fine particle of the crosslinked polymer prepared in the Synthesis Example 2 was used as a spacer particle, and a glass sheet having a thickness of 0.7 mm was used as a substrate to prepare a 240° super-twisted nematic liquid crystal display having a cell size of 10 inches in terms of the diagonal size, the number of dots of 640×480 and a cell gap of 7.5 μm. The obtained display exhibited a uniform display quality free from the cell gap deviation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim:

1. A liquid crystal display comprising:
   two sheets of substrates disposed opposite to each other;
   transparent electrodes disposed on each of said substrates;
   orientation films disposed over said transparent electrodes;
   a spacer particle having an elastic modulus in compression of 370 to 550 kg/mm$^2$ at the 10% displacement of particle diameter disposed between said orientation films; and
   a liquid crystal layer disposed between said orientation films.

2. The liquid crystal display according to claim 1, wherein at least one of the two sheets of said substrates comprises a plastic substrate.

3. A spacer particle for a liquid crystal display comprising an a elastic modulus in compression of 370 to 550 kg/mm$^2$ at the 10% displacement of particle diameter.

4. The spacer particle according to claim 3, wherein the particle has a mean particle diameter of 3 to 10 μm.

5. The spacer particle according to claim 3, wherein the particle has a standard deviation of the particle diameter of 10% or less of the mean particle diameter.

6. The spacer particle according to claim 3, wherein the particle is made of a crosslinked (co)polymer.

7. The spacer particle according to claim 6, wherein the crosslinked (co)polymer is vinyl copolymer.

* * * * *